United States Patent
Marx et al.

(10) Patent No.: US 10,577,451 B2
(45) Date of Patent: Mar. 3, 2020

(54) THERMALLY STABLE MICROSTRUCTURED SEMI-IPN LAYER

(71) Applicant: 3M INNOVATIVE PROPERTIES COMPANY, St. Paul, MN (US)

(72) Inventors: Ryan E. Marx, Rosemount, MN (US); David A. Ylitalo, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 115 days.

(21) Appl. No.: 15/574,176

(22) PCT Filed: May 13, 2016

(86) PCT No.: PCT/US2016/032259
§ 371 (c)(1),
(2) Date: Nov. 15, 2017

(87) PCT Pub. No.: WO2016/191118
PCT Pub. Date: Dec. 1, 2016

(65) Prior Publication Data
US 2018/0127534 A1    May 10, 2018

Related U.S. Application Data

(60) Provisional application No. 62/165,578, filed on May 22, 2015.

(51) Int. Cl.
| | |
|---|---|
| *C09J 7/25* | (2018.01) |
| *C08G 18/08* | (2006.01) |
| *C08G 18/42* | (2006.01) |
| *C09J 133/08* | (2006.01) |
| *B64C 21/10* | (2006.01) |
| *C08G 18/66* | (2006.01) |
| *C08G 18/32* | (2006.01) |
| *B64D 45/00* | (2006.01) |

(52) U.S. Cl.
CPC .......... *C08G 18/0895* (2013.01); *B64C 21/10* (2013.01); *C08G 18/3203* (2013.01); *C08G 18/4277* (2013.01); *C08G 18/664* (2013.01); *C09J 7/25* (2018.01); *C09J 133/08* (2013.01); *B64C 2230/26* (2013.01); *B64D 2045/009* (2013.01); *C08G 2270/00* (2013.01); *C09J 2475/006* (2013.01)

(58) Field of Classification Search
CPC ............ C08G 18/0895; C08G 18/3202; C08G 18/664; C08G 18/4277; C08G 2207/00; B64C 21/10; B64C 2230/26; C09J 7/25; C09J 133/08; C09J 2475/006; B64D 2045/009
See application file for complete search history.

(56) References Cited

U.S. PATENT DOCUMENTS

| | | |
|---|---|---|
| 4,302,553 A | 11/1981 | Frisch |
| 4,859,742 A | 8/1989 | Pattein |
| 4,948,859 A | 8/1990 | Echols |
| 5,133,516 A | 7/1992 | Marentic |
| 5,959,775 A | 9/1999 | Joseph |
| 6,623,824 B1 | 9/2003 | Joseph |
| 7,713,604 B2 | 5/2010 | Yang |
| 8,096,508 B2 | 1/2012 | Marx |
| 8,668,166 B2 | 3/2014 | Rawlings |
| 8,916,271 B2 | 12/2014 | Marx |
| 2005/0106360 A1* | 5/2005 | Johnston ............ E04B 1/66 428/167 |
| 2009/0039200 A1 | 2/2009 | Marx |
| 2009/0202825 A1 | 8/2009 | Marx |
| 2010/0282909 A1 | 11/2010 | Rawlings |
| 2011/0262705 A1* | 10/2011 | Gupta ............... B64C 21/10 428/156 |
| 2014/0174642 A1 | 6/2014 | Rawlings |

OTHER PUBLICATIONS

Sanchez-Adsuar, M.S. et al.,"Rheological characterization of thermoplastic polyurethane elastomers", *Poly Int*, (2000), vol. 49, pp. 591-598.
International Search Report for PCT/US2016/032259 dated Aug. 4, 2016 (5 pages).

* cited by examiner

*Primary Examiner* — Robert S Jones
(74) *Attorney, Agent, or Firm* — Philip P. Soo

(57) ABSTRACT

Thermally stable microstructured layers comprising polyurethane, polyurea and/or polyurethane/urea semi-IPN materials are provided which have microstructured surfaces which are highly durable, erosion resistant, and thermally stable. The microstructured layer comprises a semi-IPN of a polymer network selected from the group consisting of urethane acrylate polymer networks, urethane/urea acrylate polymer networks and urea acrylate polymer networks and a linear or branched polymer that is a thermoplastic polymer selected from the group consisting of thermoplastic polyurethanes, thermoplastic polyurethane/polyureas, thermoplastic polyureas, and combinations thereof. The microstructures are thermally stable at temperatures above the crossover point of the thermoplastic polymer, despite comprising a majority of such thermoplastic material. In another aspect, the present disclosure provides methods of making microstructured layers according to the present disclosure.

18 Claims, 1 Drawing Sheet

THERMALLY STABLE MICROSTRUCTURED SEMI-IPN LAYER

CROSS REFERENCE TO RELATED APPLICATIONS

This application is a national stage filing under 35 U.S.C. 371 of PCT/US2016/032259, filed May 13, 2016, which claims the benefit of Provisional Patent Application No. 62/165,578, filed May 22, 2015, the disclosures of which are incorporated by reference in their entirety herein.

FIELD OF THE DISCLOSURE

This disclosure relates to layers, such as surfacing films, comprising polyurethane, polyurea and/or polyurethane/urea semi-IPN materials, the layers having microstructured surfaces which are highly durable, erosion resistant, and thermally stable.

BACKGROUND OF THE DISCLOSURE

The following references may be relevant to the general field of technology of the present disclosure: U.S. Pat. Nos. 8,096,508; 5,959,775; 4,948,859; 4,859,742; 4,302,553; 8,916,271; 6,623,824; 7,713,604; 8,668,166; US 2010/0282909; and US 2014/0174642.

U.S. Pat. No. 8,916,271 relates to semi-IPN polyurethane/polyurea protective films.

U.S. Pat. No. 6,623,824, "Method for Making a Microreplicated Article Using a Substrate Comprising a Syndiotactic Vinyl Aromatic Polymer," purports to describe a "urethane acrylate IPN formulation," e.g., at Examples 14, 15, C1, 20, and 21. The term "IPN" is used there in a manner inconsistent with the manner in which it is used in the present application. Each "urethane acrylate IPN formulation" of U.S. Pat. No. 6,623,824, Examples 14, 15, C1, 20, and 21 includes caprolactone acrylate, a monomer having a hydroxy group reactive with polyurethane-forming (polyisocyanate) monomers at one end, and an acrylate group reactive with polyacrylate-forming monomers at the other. Therefore, it is believed that upon heat cure of the polyurethane-forming and polyacrylate-forming monomers of the "urethane acrylate IPN formulation," one single polymer network is formed.

SUMMARY OF THE DISCLOSURE

Briefly, the present disclosure provides an article comprising a microstructured layer having a microstructured surface bearing microstructures having an average height of greater than 3.0 microns and less than 300.0 microns, the microstructured layer comprising a semi-IPN of a polymer network selected from the group consisting of urethane acrylate polymer networks, urethane/urea acrylate polymer networks and urea acrylate polymer networks and a linear or branched polymer that is a thermoplastic polymer selected from the group consisting of thermoplastic polyurethanes, thermoplastic polyurethane/polyureas, thermoplastic polyureas, and combinations thereof. In some embodiments, the microstructures are thermally stable to the extent that they retain their shape when heated to a temperature of 102° C. (215° F.) for 30 minutes; in some embodiments to a temperature of 132° C. (270° F.) for 30 minutes; and in some embodiments to a temperature of 149° C. (300° F.) for 30 minutes. In some embodiments, where the thermoplastic polymer has a G' G" crossover point at a certain temperature; the microstructures are thermally stable to the extent that they retain their shape when heated to a temperature of more than 30° C. higher than the thermoplastic polymer G' G" crossover point for 30 minutes; in some embodiments, more than 40° C. higher; and in some embodiments, more than 50° C. higher. In some embodiments, the weight ratio of linear or branched polymer to polymer network in the semi-IPN is greater than 52:48, in some embodiments greater than 75:25, in some embodiments greater than 80:20, in some embodiments greater than 85:15, in some embodiments greater than 89:11 and in some embodiments greater than 94:6. In some embodiments, the thermoplastic polymer has a G' G" crossover point at a temperature of less than 149° C., in some less than 132° C., in some less than 115° C., in some less than 102° C., and in some less than 100° C. In some embodiments the article additionally comprises an adhesive layer. In some such embodiments the adhesive layer is attached to the back surface of the microstructured layer opposite the microstructured surface. In some such embodiments the adhesive is a thermally cured adhesive curing at a temperature of not less than 80° C., in some not less than 100° C., in some not less than 120° C., and in some not less than 140° C.

In some embodiments, the article is a free-standing film, whereas in other embodiments the article is a part comprising the microstructured layer, in particular a part having the microstructured surface of the microstructured layer as an outermost surface. In some such embodiments the part comprises a metal part. In some such embodiments, the part comprises a resin matrix-fiber composite part, including embodiments wherein the back surface of the microstructured layer is bound by the resin matrix to the resin matrix itself to the resin matrix-fiber composite part. In some embodiments the article additionally comprises a removable liner having a complimentary microstructured surface in direct contact with the microstructured surface of the microstructured layer. Additional embodiments of the article comprising a microstructured layer according to the present disclosure are described below under "Selected Embodiments."

In another aspect, the present disclosure provides methods of making microstructured layers according to the present disclosure. In some embodiments, the method comprises the steps of: a) providing a liner having a complimentary microstructured surface; b) casting onto the liner a polymer blend comprising: i) an oligomer selected from the group consisting of urethane acrylate oligomers, urethane/urea acrylate oligomers, urea acrylate oligomers, and combinations thereof; and ii) a linear or branched polymer that is a thermoplastic polymer selected from the group consisting of thermoplastic polyurethanes, thermoplastic polyurethane/polyureas, thermoplastic polyureas, and combinations thereof; and c) thereafter curing the oligomer by radiation cure to convert the polymer blend into a microstructured layer having a microstructured surface. In some embodiments, the method additionally comprises the step of: d) applying an adhesive to the back surface of the microstructured layer to make an adhesive-backed microstructured layer. In some embodiments, the method additionally comprises the steps of: d) applying the adhesive-backed microstructured layer to a part; and e) removing the liner from the microstructured layer to make a part having the microstructured surface of the microstructured layer as an outermost surface. In some embodiments, the method comprises the steps of: f) applying the back surface of a microstructured layer to an uncured resin matrix-fiber composite part; g) curing the resin matrix; and h) removing the liner from the microstructured layer to make a resin matrix-fiber composite part having the microstructured surface of the microstructured layer as an outermost surface. In some embodiments, casting the polymer blend onto the liner comprises hot melt extrusion of the polymer blend. In some embodiments, the polymer blend comprises not more than 1.0 weight percent solvent; in some embodiments not more than 0.1 weight percent. In some embodiments, curing the oligomer by radiation cure comprises e-beam cure. In some embodiments, curing the oligomer by radiation cure comprises UV cure. Additional embodiments of the methods according to the present disclosure are described below under "Selected Embodiments."

In some embodiments, the present disclosure provides highly erosion resistant and thermally stable surfacing films for aeronautic applications which bear drag-reduction microstructures that maintain shape during high temperature processing and during exposure to high temperature working environments.

What has not been described in the art, and is provided by the present disclosure, is a highly durable and thermally stable film surface patterned with microstructures that maintain shape in high temperature environments, as well as methods of patterning such films with such microstructures. It is an unexpected feature of the present disclosure that this thermally stable microstructured film can be made with melt-processable materials comprising high amounts of thermoplastic.

In this application:

"continuous processes by roll" is a process that may be operated continuously from the loading of roll good raw materials until the roll good raw materials are expended;

"free-standing film" means a solid film having mechanical integrity independent of contact with any supporting material (excluding, inter alia, liquids and surface coatings without independent mechanical integrity);

"height" means, with regard to microstructures of a microstructured surface of a microstructured layer, the greatest difference in elevation of the surface measured along an axis orthogonal to the general plane of the microstructured layer in the vicinity of the microstructure, e.g., in a ridge-and-valley pattern, the difference between the ridge peak and valley bottom;

"interpenetrating polymer network" or "IPN" means a material comprising two or more polymer networks which are at least partially interlaced on a molecular scale but not covalently bonded to each other and cannot be separated unless chemical bonds are broken;

"pitch" means, with regard to microstructures of a microstructured surface of a microstructured layer, the distance between successive corresponding points or lines within the general plane of the micro structured layer in the vicinity of the microstructure, e.g., in a ridge-and-valley pattern, the distance between adjacent ridge peaks;

"polyurethane/polyurea" means a polymer or oligomer comprising both urethane and urea linkages in its backbone, including a polymer or oligomer obtained by polymerizing a mixture that includes a polyisocyanate, a polyol and a polyamine;

"semi-interpenetrating polymer network" or "semi-IPN" means a material comprising at least one polymer network and at least one linear or branched polymer, not covalently bonded to each other, characterized by the penetration on a molecular scale of the network by the linear or branched polymer;

"urea acrylate oligomer" means a polyurea oligomer having polymerizable acrylate end groups;

"urea acrylate polymer network" means a polymer network comprising polyurea segments and polyacrylate segments, including a polymer network obtained by polymerizing the acrylate end groups of one or more urea acrylate oligomers;

"urethane acrylate oligomer" means a polyurethane oligomer having polymerizable acrylate end groups;

"urethane acrylate polymer network" means a polymer network comprising polyurethane segments and polyacrylate segments, including a polymer network obtained by polymerizing the acrylate end groups of one or more urethane acrylate oligomers;

"urethane/urea acrylate oligomer" means a polyurethane/polyurea oligomer having polymerizable acrylate end groups; and "urethane/urea acrylate polymer network" means a polymer network comprising polyurethane/polyurea segments and polyacrylate segments, including a polymer network obtained by polymerizing the acrylate end groups of one or more urethane/urea acrylate oligomers.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

DETAILED DESCRIPTION

Figure 1A:
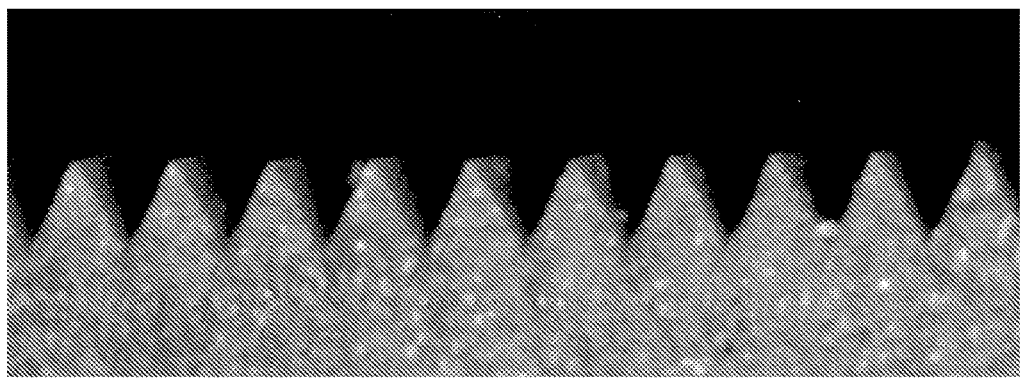
FIG. 1A is a micrograph of an embodiment of a microstructured layer according to the present disclosure, as described in the Examples section herein.
Figure 1B:
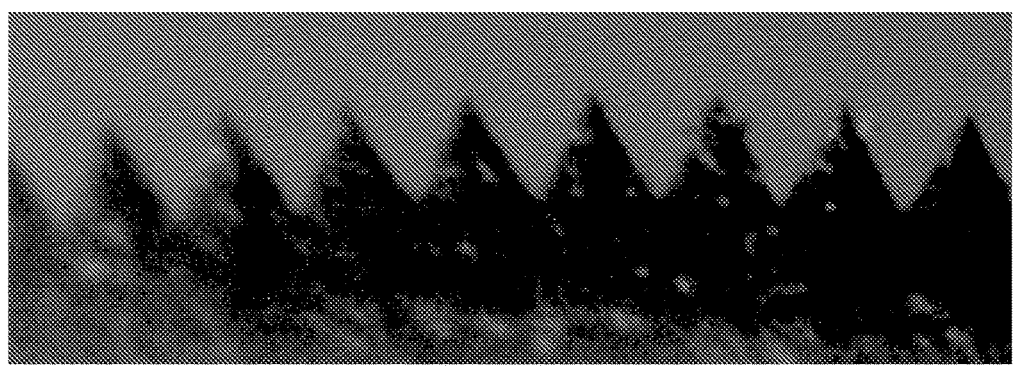
FIG. 1B is a micrograph of the microstructured layer of FIG. 1A after exposure to a temperature of 102° C. (215° F.) for 30 minutes, as described in the Examples section herein.
Figure 1C:
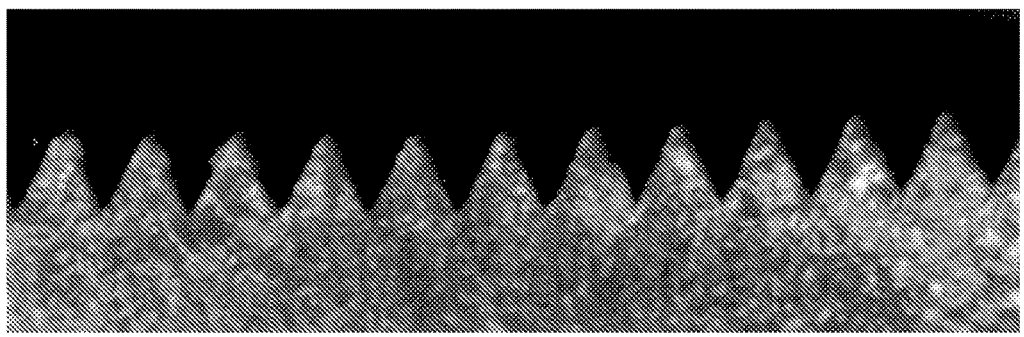
FIG. 1C is a micrograph of the microstructured layer of FIG. 1A after exposure to a temperature of 132° C. (270° F.) for 30 minutes, as described in the Examples section herein.
Figure 1D:
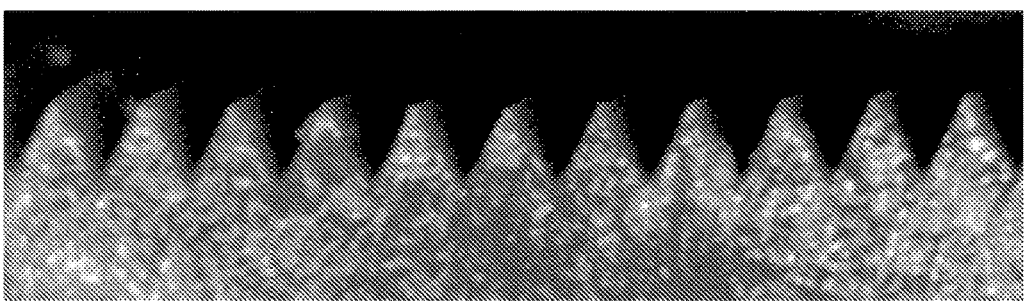
FIG. 1D is a micrograph of the microstructured layer of FIG. 1A after exposure to a temperature of 149° C. (300° F.) for 30 minutes, as described in the Examples section herein.

The present disclosure provides microstructured layers composed of polyurethane, polyurea and/or polyurethane/urea semi-IPN materials, the layers having microstructured surfaces which are highly durable and thermally stable. In some embodiments, the present disclosure provides highly erosion resistant and thermally stable surfacing films for aeronautic applications which bear drag-reduction microstructures that maintain shape in high temperature environments. Surprisingly, this thermally stable microstructured film can be made with melt-processable materials comprising high amounts of thermoplastic.

In some embodiments, microstructured layers according to the present disclosure can be used to protect surfaces of aircraft including leading edges of wings, radomes, blades, and rotors from damage due to water, sand, dust, or debris.

The microstructured layer may be made by any suitable method, including those demonstrated in the Examples below. In one such method, a liner having a complimentary microstructured surface is provided, i.e., a surface complementary to the desired surface of the microstructured layer. A thermoplastic polymer blend is cast onto the liner and cured, in some embodiments by radiation cure, such as e-beam, UV, IR, gamma, or light cure. Typically the thermoplastic polymer blend is a hot melt blend, essentially without solvent. The thermoplastic polymer blend includes: i) an oligomer, which is a urethane acrylate oligomer, a urethane/urea acrylate oligomer, a urea acrylate oligomers, or some combination thereof; and ii) a thermoplastic polymer that is a thermoplastic polyurethane, thermoplastic polyurethane/polyurea, thermoplastic polyurea, or combinations thereof. In some embodiment an adhesive is subsequently added to the back side of the microstructured layer; in others no adhesive is added. It will be understood that the use of the term oligomer does not place any upper limit on the size of the molecule, and analogous polymers are included in any reference herein to oligomers.

Resin matrix-fiber composites have become widely accepted for the variety of applications in aerospace, automotive and other transportation industries because their light weight, high strength and stiffness. These parts are typically manufactured under vacuum and/or pressure at temperatures from 0° C. to 180° C. and occasionally up to 230° C. In some embodiments the microstructured layer according to the present disclosure may be adhered to such a composite part prior to cure and incorporated into the part as an outermost layer without loss of fidelity in the microstructured surface pattern.

Any suitable microstructures may be formed in the surface of the microstructured layers according to the present disclosure. In some embodiments, drag reduction microstructures are used, which may comprise patterns of multiple parallel ridges. The microstructured layer is typically transparent or translucent but may also be pigmented.

Any suitable thermoplastic polyurethane, polyurea or polyurethane/polyurea may be used as the linear or branched polymer in the semi-IPN of the present disclosure. Suitable polyurethanes may include polymers of polyisocyanates and polyols. Suitable polyureas may include polymers of polyisocyanates and polyamines. In some embodiments, the crosslinked polymer may be a mixed polyurethane/polyurea polymer derived from polyisocyanates and a mixture of polyols and polyamines. Any suitable polyisocyanates, polyols or polyamines may be used. Suitable polyisocyanates may include aromatic isocyanates, aliphatic isocyanates, polyisocyanates, or combinations thereof. Suitable aromatic isocyanates may include Methylene diphenyl diisocyanate, 1,4-Phenylene diisocyanate, 1,3-Phenylene diisocyanate, 3,3'-Dimethyl diphenylmethane-4,4'-diisocyanate, Diphenylmethane-2,2'-diisocyanate, naphthalene diisocyanate, 4,4'-Biphenyldiisocyanate, 1,5-Naphthalene Diisocyanate, 2-Methyl-1,5-naphthalene diisocyanate, 2,4-toluene diisocyanate and 2,6-toluene diisocyanate and mixtures of the two isomers, diphenylmethane-2,4'-diisocyanate, 4-Ethyl-m-phenylenediisocyanate, and the like, or mixtures thereof. Suitable aliphatic isocyanates may include 2,4,4-Trimethylhexamethylene diisocyanate, 2,2,4-Trimethylhexamethylene diisocyanate, 1,4-Cyclohexane diisocyanate, 1,3-cyclohexyl diisocyanate, Trimethylhexamethylene diisocyanate, Isophorone Diisocyanate (IPDI), Decamethylene diisocyanate, Methylene diisocyanate, Methylene-bis(4-Cyclohexylisocyanate) (H12MDI), dimethyl diisocyanate, trans-1,4-Cyclohexane diisocyanate, hexamethylene diisocyanate, and the like, or mixtures thereof. Other suitable isocyanates may include polyisocyanates, including those based on any of the above. Suitable polyols may include polyester polyols, polycaprolactone polyols, polyether polyols, hydroxyl terminated polybutadiene and hydrogenated polybutadiene polyols, polycarbonate polyols, and the like, or mixtures thereof. Suitable polyamines may include JEFFAMINE® polyetheramines and the like, or mixtures thereof. In addition, chain extenders may be included, which are typically monomeric or low molecular weight difunctional compounds. Suitable hydroxy chain extenders may include ethylene glycol, diethylene glycol, propylene glycol, dipropylene glycol, neopentyl glycol, 1,4 butanediol, and 2-methyl-1,3-propylenediol and the like, or mixtures thereof. Suitable amino chain extenders may include 1,4 diaminobutane, Ethylenediamine, 1,2 diaminopropane, 1,3 diaminopropane, 1,2 diaminocyclohexane, isophorone diamine, secondary cycloaliphatic diamines, diethyltoluenediamine, and the like, or mixtures thereof.

In some embodiments of the microstructured layer according to the present invention, the microstructures are unexpectedly stable at temperatures above the G' G" crossover point of the thermoplastic polymer, i.e., the point where G" (loss modulus) surpasses G' (storage modulus), and viscous behavior surpasses elastic behavior. For a thermoplastic polyurethane (urea) elastomer, this signifies an onset of melting. The viscoelastic properties are measured via parallel plate rheology. See, e.g., Sanchez-Adsuar, M. S.; Papon, E.; Villenave, J.-J. Polym Int 2000, 49, 591. Furthermore, in some embodiments of the microstructured layer according to the present invention, the microstructures are unexpectedly stable at temperatures above the crossover point of the thermoplastic polymer despite the fact that the microstructured layer comprises a majority of such thermoplastic material.

Any suitable polyurethane acrylate oligomer, polyurea acrylate oligomer or polyurethane/polyurea acrylate oligomer may be used in the practice of the present disclosure. The acrylate component is derived from any suitable acrylate component precursor, which is any suitable monomer, oligomer or polymer with an acrylate double bond available for polymerization. The acrylate component precursor is copolymerized into the oligomer, typically as an end group. In other embodiments, acrylated polyurethane, polyurea, or polyurethane/polyurea polymers may be used, which may be linear or branched.

In embodiments where an adhesive is present, any suitable adhesive layer may be used. In one embodiment, the adhesive layer may comprise an acrylic adhesive. In one embodiment, the adhesive is a pressure-sensitive adhesive. In one embodiment, the adhesive is a structural adhesive. In one embodiment, the adhesive is two-part adhesive. In one embodiment, the adhesive is an energy-cured adhesive. In one embodiment, the adhesive is an air cured adhesive. Suitable adhesives may include acrylics, polyurethanes, silicones, styrene-butadiene block copolymers, styrene-isoprene block copolymers, epoxies, cyanoacrylates, two-part urethane, and the like.

Selected Embodiments

The following embodiments, designated by letter and number, are intended to further illustrate the present disclosure but should not be construed to unduly limit this disclosure.

A1. An article comprising a microstructured layer having a microstructured surface bearing microstructures having an average height of greater than 3.0 microns and less than 300.0 microns, the microstructured layer comprising a semi-IPN of a polymer network selected from the group consisting of urethane acrylate polymer networks, urethane/urea acrylate polymer networks and urea acrylate polymer networks and a linear or branched polymer that is a thermoplastic polymer selected from the group consisting of thermoplastic polyurethanes, thermoplastic polyurethane/polyureas, thermoplastic polyureas, and combinations thereof.

A2. The article according to embodiment A1 wherein the microstructures are thermally stable to the extent that they retain their shape when heated to a temperature of 102° C. (215° F.) for 30 minutes.

A3. The article according to embodiment A1 wherein the microstructures are thermally stable to the extent that they retain their shape when heated to a temperature of 132° C. (270° F.) for 30 minutes.

A4. The article according to embodiment A1 wherein the microstructures are thermally stable to the extent that they retain their shape when heated to a temperature of 149° C. (300° F.) for 30 minutes.

A5. The article according to any of the preceding embodiments wherein the thermoplastic polymer has a G' G" crossover point at a certain temperature and wherein the microstructures are thermally stable to the extent that they retain their shape when heated to a temperature of more than 30° C. higher than the thermoplastic polymer G' G" crossover point for 30 minutes.

A6. The article according to any of the preceding embodiments wherein the thermoplastic polymer has a G' G" crossover point at a certain temperature and wherein the microstructures are thermally stable to the extent that they retain their shape when heated to a temperature of more than 40° C. higher than the thermoplastic polymer G' G" crossover point for 30 minutes.

A7. The article according to any of the preceding embodiments wherein the thermoplastic polymer has a G' G" crossover point at a certain temperature and wherein the microstructures are thermally stable to the extent that they retain their shape when heated to a temperature of more than 50° C. higher than the thermoplastic polymer G' G" crossover point for 30 minutes.

A8. The article according to any of the preceding embodiments wherein the weight ratio of linear or branched polymer to polymer network in the semi-IPN is greater than 52:48.

A9. The article according to any of the preceding embodiments wherein the weight ratio of linear or branched polymer to polymer network in the semi-IPN is greater than 75:25.

A10. The article according to any of the preceding embodiments wherein the weight ratio of linear or branched polymer to polymer network in the semi-IPN is greater than 80:20.

A11. The article according to any of the preceding embodiments wherein the weight ratio of linear or branched polymer to polymer network in the semi-IPN is greater than 85:15.

A12. The article according to any of the preceding embodiments wherein the weight ratio of linear or branched polymer to polymer network in the semi-IPN is greater than 89:11.

A13. The article according to any of the preceding embodiments wherein the weight ratio of linear or branched polymer to polymer network in the semi-IPN is greater than 94:6.

A14. The article according to any of the preceding embodiments wherein the thermoplastic polymer has a G' G" crossover point at a temperature of less than 149° C.

A15. The article according to any of the preceding embodiments wherein the thermoplastic polymer has a G' G" crossover point at a temperature of less than 132° C.

A16. The article according to any of the preceding embodiments wherein the thermoplastic polymer has a G' G" crossover point at a temperature of less than 115° C.

A17. The article according to any of the preceding embodiments wherein the thermoplastic polymer has a G' G" crossover point at a temperature of less than 102° C.

A18. The article according to any of the preceding embodiments wherein the thermoplastic polymer has a G' G" crossover point at a temperature of less than 100° C.

A19. The article according to any of embodiments A1-A18 wherein the thermoplastic polymer is a thermoplastic polyurethane.

A20. The article according to any of embodiments A1-A18 wherein the thermoplastic polymer is a thermoplastic polyurethane/polyurea.

A21. The article according to any of embodiments A1-A18 wherein the thermoplastic polymer is a thermoplastic polyurea.

A22. The article according to any of embodiments A1-A21 wherein the polymer network is a urethane acrylate polymer network.

A23. The article according to any of embodiments A1-A21 wherein the polymer network is a urethane/urea acrylate polymer network.

A24. The article according to any of embodiments A1-A21 wherein the polymer network is a urea acrylate polymer network.

A25. The article according to any of the preceding embodiments wherein the microstructures having an average height of greater than 7.0 microns.

A26. The article according to any of the preceding embodiments wherein the microstructures having an average height of greater than 12.0 microns.

A27. The article according to any of the preceding embodiments wherein the microstructures having an average height of greater than 17.0 microns.

A28. The article according to any of the preceding embodiments wherein the microstructures having an average height of less than 170.0 microns.

A29. The article according to any of the preceding embodiments wherein the microstructures having an average height of less than 120.0 microns.

A30. The article according to any of the preceding embodiments wherein the microstructures having an average height of less than 90.0 microns.

A31. The article according to any of the preceding embodiments wherein the microstructures having an average height of less than 70.0 microns.

A32. The article according to any of embodiments A1-A31 wherein the microstructures comprise a regular pattern of ridges having a fixed pitch.

A33. The article according to any of embodiments A1-A31 wherein the microstructures comprise a regular pattern of ridges having a varying pitch.

A34. The article according to any of embodiments A1-A31 wherein the microstructures comprise a regular pattern of ridges having a monotonically increasing pitch.

A35. The article according to any of embodiments A29-A34 wherein the average pitch is between 2.0 microns and 300.0 microns.

A36. The article according to embodiment A35 wherein the average pitch is greater than 7.0 microns.

A37. The article according to embodiment A35 wherein the average pitch is greater than 12.0 microns.

A38. The article according to embodiment A35 wherein the average pitch is greater than 17.0 microns.

A39. The article according to any of embodiments A35-A38 wherein the average pitch is less than 170.0 microns.

A40. The article according to any of embodiments A352-A38 wherein the average pitch is less than 120.0 microns.

A41. The article according to any of embodiments A352-A38 wherein the average pitch is less than 90.0 microns.

A42. The article according to any of embodiments A35-A38 wherein the average pitch is less than 70.0 microns.

A43. The article according to any of the preceding embodiments additionally comprising an adhesive layer.

A44. The article according to embodiment A43 wherein the microstructured layer has a back surface opposite the microstructured surface and wherein the adhesive layer is attached to the back surface of the microstructured layer.

A45. The article according to embodiment A43 wherein the microstructured layer has a back surface opposite the microstructured surface and wherein the adhesive layer is attached directly to the back surface of the microstructured layer.

A46. The article according to any of embodiments A43-A45 wherein the adhesive is a thermally cured adhesive curing at a temperature of not less than 80° C.

A47. The article according to any of embodiments A43-A45 wherein the adhesive is a thermally cured adhesive curing at a temperature of not less than 100° C.

A48. The article according to any of embodiments A43-A45 wherein the adhesive is a thermally cured adhesive curing at a temperature of not less than 120° C.

A49. The article according to any of embodiments A43-A45 wherein the adhesive is a thermally cured adhesive curing at a temperature of not less than 140° C.

A50. The article according to any of the preceding embodiments wherein the microstructured layer has a thickness of between 30.0 and 3000 microns.

P1. The article according to any of embodiments A1-A50 which is a free-standing film.

P2. The article according to any of embodiments A1-A50 which is a part having the microstructured surface of the microstructured layer as an outermost surface.

P3. The article according to any of embodiments A1-A50 which is comprises resin matrix-fiber composite part.

P4. The article according to any of embodiments A1-A50 which comprises a resin matrix-fiber composite part having the microstructured surface of the microstructured layer as an outermost surface.

P5. The article according to embodiment P3 or P4 wherein the resin matrix comprises epoxy resin.

P6. The article according to any of embodiments P3-P5 wherein the fiber comprises carbon fiber.

P7. The article according to any of embodiments P3-P5 wherein the fiber comprises glass fiber.

P8. The article according to any of embodiments A1-A50 which comprises a metal part.

P9. The article according to any of embodiments A1-A50 which comprises a metal part having the microstructured surface of the microstructured layer as an outermost surface.

P10. The article according to any of embodiments P2-P9 wherein the microstructured layer is bound to the part through an adhesive layer, wherein the microstructured layer has a back surface opposite the microstructured surface and wherein the adhesive layer is attached directly to the back surface of the microstructured layer.

P11. The article according to embodiment P10 wherein the adhesive is a thermally cured adhesive curing at a temperature of not less than 80° C.

P12. The article according to embodiment P10 wherein the adhesive is a thermally cured adhesive curing at a temperature of not less than 100° C.

P13. The article according to embodiment P10 wherein the adhesive is a thermally cured adhesive curing at a temperature of not less than 120° C.

P14. The article according to embodiment P10 wherein the adhesive is a thermally cured adhesive curing at a temperature of not less than 140° C.

P15. The article according to any of embodiments P3-P7 wherein the microstructured layer is bound directly to the resin matrix of the resin matrix-fiber composite part, wherein the microstructured layer has a back surface opposite the microstructured surface and wherein the resin matrix is attached directly to the back surface of the microstructured layer.

AL1. The article according to any of embodiments A1-A50 or P1-P15 additionally comprising a removable liner having a complimentary microstructured surface in direct contact with the microstructured surface of the microstructured layer.

AL2. The article according to embodiment AL1 wherein the liner comprises a polymeric material.

AL3. The article according to embodiment AL1 wherein the liner comprises a polymeric material surface-treated with a silicone or a fluorine-containing compound.

AL4. The article according to embodiment AL1 wherein the liner comprises a polymeric material surface-treated with hexafluoropropylene oxide (HFPO).

AL5. The article according to any of embodiments AL1-AL4 wherein the liner comprises a polyolefin resin.

AL6. The article according to any of embodiments AL1-AL4 wherein the liner comprises a polyester resin.

AL7. The article according to any of embodiments AL1-AL4 wherein the liner comprises a surface of crosslinked acrylate resin.

M1. A method comprising the steps of:
  a) providing a liner having a complimentary microstructured surface;
  b) casting onto the liner a polymer blend comprising:
    i) an oligomer selected from the group consisting of urethane acrylate oligomers, urethane/urea acrylate oligomers, urea acrylate oligomers, and combinations thereof; and
    ii) a linear or branched polymer that is a thermoplastic polymer selected from the group consisting of thermoplastic polyurethanes, thermoplastic polyurethane/polyureas, thermoplastic polyureas, and combinations thereof;
  c) thereafter curing the oligomer by radiation cure to convert the polymer blend into a microstructured layer having a microstructured surface.

M2. The method according to embodiment M1, wherein the microstructured layer has a back surface opposite the microstructured surface, additionally comprising the step of:
  d) applying an adhesive to the back surface of the microstructured layer to make an adhesive-backed microstructured layer.

M3. The method according to embodiment M2, additionally comprising the steps of:

d) applying the adhesive-backed microstructured layer to a part; and e) removing the liner from the microstructured layer to make a part having the microstructured surface of the microstructured layer as an outermost surface.

M4. The method according to embodiment M3, wherein the part is a resin matrix-fiber composite part.

M5. The method according to embodiment M3 or M4, additionally comprising the step of heat curing the adhesive after applying the adhesive-backed microstructured layer to a part and before removing the liner.

M6. The method according to embodiment M5 wherein the adhesive is a thermally cured adhesive curing at a temperature of not less than 80° C.

M7. The method according to embodiment M5 wherein the adhesive is a thermally cured adhesive curing at a temperature of not less than 100° C.

M8. The method according to embodiment M5 wherein the adhesive is a thermally cured adhesive curing at a temperature of not less than 120° C.

M9. The method according to embodiment M5 wherein the adhesive is a thermally cured adhesive curing at a temperature of not less than 140° C.

M10. The method according to embodiment M1, wherein the microstructured layer has a back surface opposite the microstructured surface, additionally comprising the steps of:

f) applying the back surface of the microstructured layer to an uncured resin matrix-fiber composite part;

g) curing the resin matrix; and h) removing the liner from the microstructured layer to make a resin matrix-fiber composite part having the microstructured surface of the microstructured layer as an outermost surface.

M11. The method according to embodiment M10, wherein the step of curing the resin matrix comprises heat curing to a temperature of not less than 80° C.

M12. The method according to embodiment M10, wherein the step of curing the resin matrix comprises heat curing to a temperature of not less than 100° C.

M13. The method according to embodiment M10, wherein the step of curing the resin matrix comprises heat curing to a temperature of not less than 120° C.

M14. The method according to embodiment M10, wherein the step of curing the resin matrix comprises heat curing to a temperature of not less than 140° C.

M15. The method according to any of embodiments M1-M14 wherein the step of curing the oligomer by radiation cure comprises curing the oligomer by e-beam cure.

M16. The method according to any of embodiments M1-M14 wherein the step of curing the oligomer by radiation cure comprises curing the oligomer by UV cure.

M17. The method according to any of embodiments M1-M16 wherein the polymer blend comprises not more than 1.0 weight percent solvent.

M18. The method according to any of embodiments M1-M16 wherein the polymer blend comprises not more than 0.1 weight percent solvent.

M19. The method according to any of embodiments M1-M18 wherein the step of casting onto the liner a polymer blend comprises hot melt extrusion of the polymer blend.

M20. The method according to any of embodiments M1-M19 wherein the liner having a complimentary microstructured surface is provided as a roll good and steps a), b) and c) are practiced as a continuous process by roll.

M21. The method according to any of embodiments M1-M20 wherein the weight ratio of linear or branched polymer to polymer network in the semi-IPN is greater than 52:48.

M22. The method according to any of embodiments M1-M20 wherein the weight ratio of linear or branched polymer to polymer network in the semi-IPN is greater than 75:25.

M23. The method according to any of embodiments M1-M20 wherein the weight ratio of linear or branched polymer to polymer network in the semi-IPN is greater than 80:20.

M24. The method according to any of embodiments M1-M20 wherein the weight ratio of linear or branched polymer to polymer network in the semi-IPN is greater than 85:15.

M25. The method according to any of embodiments M1-M20 wherein the weight ratio of linear or branched polymer to polymer network in the semi-IPN is greater than 89:11.

M26. The method according to any of embodiments M1-M20 wherein the weight ratio of linear or branched polymer to polymer network in the semi-IPN is greater than 94:6.

M27. The method according to any of embodiments M1-M26 wherein the thermoplastic polymer has a G' G" crossover point at a temperature of less than 149° C.

M28. The method according to any of embodiments M1-M26 wherein the thermoplastic polymer has a G' G" crossover point at a temperature of less than 132° C.

M29. The method according to any of embodiments M1-M26 wherein the thermoplastic polymer has a G' G" crossover point at a temperature of less than 115° C.

M30. The method according to any of embodiments M1-M26 wherein the thermoplastic polymer has a G' G" crossover point at a temperature of less than 102° C.

M31. The method according to any of embodiments M1-M26 wherein the thermoplastic polymer has a G' G" crossover point at a temperature of less than 100° C.

M32. The method according to any of embodiments M1-M31 wherein the thermoplastic polymer is a thermoplastic polyurethane.

M33. The method according to any of embodiments M1-M31 wherein the thermoplastic polymer is a thermoplastic polyurethane/polyurea.

M34. The method according to any of embodiments M1-M31 wherein the thermoplastic polymer is a thermoplastic polyurea.

M35. The method according to any of embodiments M1-M31 wherein the oligomer is a urethane acrylate oligomer.

M36. The method according to any of embodiments M1-M31 wherein the oligomer is a urethane/urea acrylate oligomer.

M37. The method according to any of embodiments M1-M31 wherein the oligomer is a urea acrylate oligomer.

M38. The method according to any of embodiments M1-M37 wherein the microstructures having an average height of greater than 7.0 microns.

M39. The method according to any of embodiments M1-M37 wherein the microstructures having an average height of greater than 12.0 microns.

M40. The method according to any of embodiments M1-M37 wherein the microstructures having an average height of greater than 17.0 microns.

M41. The method according to any of embodiments M1-M40 wherein the microstructures having an average height of less than 170.0 microns.
M42. The method according to any of embodiments M1-M40 wherein the microstructures having an average height of less than 120.0 microns.
M43. The method according to any of embodiments M1-M40 wherein the microstructures having an average height of less than 90.0 microns.
M44. The method according to any of embodiments M1-M40 wherein the microstructures having an average height of less than 70.0 microns.
M45. The method according to any of embodiments M1-M44 wherein the microstructures comprise a regular pattern of ridges having a fixed pitch.
M46. The method according to any of embodiments M1-M44 wherein the microstructures comprise a regular pattern of ridges having a varying pitch.
M47. The method according to any of embodiments M1-M44 wherein the microstructures comprise a regular pattern of ridges having a monotonically increasing pitch.
M48. The method according to any of embodiments M1-M47 wherein the average pitch is between 2.0 microns and 300.0 microns.
M49. The method according to embodiment M48 wherein the average pitch is greater than 7.0 microns.
M50. The method according to embodiment M48 wherein the average pitch is greater than 12.0 microns.
M51. The method according to embodiment M48 wherein the average pitch is greater than 17.0 microns.
M52. The method according to any of embodiments M48-M51 wherein the average pitch is less than 170.0 microns.
M53. The method according to any of embodiments M48-M51 wherein the average pitch is less than 120.0 microns.
M54. The method according to any of embodiments M48-M51 wherein the average pitch is less than 90.0 microns.
M55. The method according to any of embodiments M48-M51 wherein the average pitch is less than 70.0 microns.
M56. The method according to any of embodiments M1-M55 wherein the liner comprises a polymeric material.
M57. The article according to embodiment M56 wherein the liner comprises a polymeric material surface-treated with a silicone or a fluorine-containing compound.
M58. The method according to embodiment M56 wherein the liner comprises a polymeric material surface-treated with hexafluoropropylene oxide (HFPO).
M59. The method according to any of embodiments M56-M58 wherein the liner comprises a polyolefin resin.
M60. The method according to any of embodiments M56-M58 wherein the liner comprises a polyester resin.
M61. The method according to any of embodiments M56-M58 wherein the liner comprises a surface of crosslinked acrylate resin.
MD1. A method comprising the steps of
  k) providing an article according to any of embodiments A43-A49;
  l) applying the article to a part so as to join the article and part by the adhesive.
MD2. The method according to embodiment MD1 wherein the part is a resin matrix-fiber composite part.
MD3. The method according to embodiment MD1 wherein the part is a metal part.
MD4. The method according to any of embodiments MD1-MD3, wherein the step of applying the article to a part so as to join the article and part by the adhesive comprises heat curing the adhesive.
MD5. The method according to any of embodiments MD1-MD4 wherein the article additionally comprises a removable liner having a complimentary microstructured surface in direct contact with the microstructured surface of the microstructured layer, the method additionally comprising the step of:
  m) removing the liner from the microstructured layer to make a part having the microstructured surface of the microstructured layer as an outermost surface.
MD6. A method comprising the steps of
  n) providing an article according to any of embodiments A1-A42, and wherein the microstructured layer has a back surface opposite the microstructured surface;
  o) applying an adhesive to the back surface of the microstructured layer to make an adhesive-backed microstructured layer;
  p) applying the article to a part so as to join the article and part by the adhesive.
MD7. The method according to embodiment MD6 wherein the part is a resin matrix-fiber composite part.
MD8. The method according to embodiment MD6 wherein the part is a metal part.
MD9. The method according to any of embodiments MD6-MD8, wherein the step of applying the article to a part so as to join the article and part by the adhesive comprises heat curing the adhesive.
MD10. The method according to any of embodiments MD6-MD9 wherein the article additionally comprises a removable liner having a complimentary microstructured surface in direct contact with the microstructured surface of the microstructured layer, the method additionally comprising the step of:
  q) removing the liner from the microstructured layer to make a part having the microstructured surface of the microstructured layer as an outermost surface.
MD11. A method comprising the steps of
  r) providing an article according to any of embodiments A1-A42;
  s) providing a part bearing adhesive on an outer surface;
  t) applying the article to a part so as to join the article and part by the adhesive.
MD12. The method according to embodiment MD11 wherein the part is a resin matrix-fiber composite part.
MD13. The method according to embodiment MD11 wherein the part is a metal part.
MD14. The method according to any of embodiments MD11-MD13, wherein the step of applying the article to a part so as to join the article and part by the adhesive comprises heat curing the adhesive.
MD15. The method according to any of embodiments MD11-MD14 wherein the article additionally comprises a removable liner having a complimentary microstructured surface in direct contact with the microstructured surface of the microstructured layer, the method additionally comprising the step of:
  u) removing the liner from the microstructured layer to make a part having the microstructured surface of the microstructured layer as an outermost surface.
MD16. A method comprising the steps of
  v) providing an article according to any of embodiments A1-A42 which additionally comprises a removable liner having a complimentary microstructured surface in direct contact with the microstructured surface of the microstructured layer, and wherein the microstructured layer has a back surface opposite the microstructured surface;
  w) applying the article to an uncured resin matrix-fiber composite part; and x) curing the resin matrix so as to join the article and part by the resin matrix MD17. The method according to embodiment MD16, wherein the step of curing the resin matrix comprises heat curing the resin matrix.

MD18. The method according to any of embodiments MD16-MD17 additionally comprising the step of:

y) removing the liner from the microstructured layer to make a part having the microstructured surface of the microstructured layer as an outermost surface.

Objects and advantages of this disclosure are further illustrated by the following examples, but the particular materials and amounts thereof recited in these examples, as well as other conditions and details, should not be construed to unduly limit this disclosure.

EXAMPLES

Unless otherwise noted, all reagents were obtained or are available from Sigma-Aldrich Company, St. Louis, Mo., or may be synthesized by known methods. Unless otherwise reported, all ratios are by weight percent.

The following abbreviations are used to describe the examples:

° C.: degree Centigrade
° F.: degree Fahrenheit
cm: centimeter
IPN: inter penetrating network
kV: kilovolt
μm: micrometers
mil: 1/1000 inch
psi: pounds per square inch
psa: pressure sensitive adhesive Abbreviations for the materials used in the examples are as follows:

MRL: A microreplicated liner which was a polyester liner bearing an array of linear ridges of triangular cross-section, valley to peak height 63 μm, peak to peak distance of 63 μm, complimentary to the array apparent in FIG. 1A.

Thermoplastic Polyurethane Blend (TPUB)

Krystalgran PN3429-108, a thermoplastic polyurethane (available from Huntsman Corporation, The Woodlands, Tex.), and CN9893, an aliphatic urethane acrylate oligomer (available from Sartomer Company, Exton, Pa.), were blended and co-extruded in a weight ratio of 90/10 on a 58 mm Davis Standard, co-rotating twin screw extruder having a L/D ratio of approximately 84:1 and a 26" (66 cm) wide die. The G' G" crossover point for Krystalgran PN3429-108 was measured to be 97° C. The polyurethane was fed by Ktron gravimetric feeder. The CN9893 was fed from a heated pressure vessel, heated with a heat blanket set to 170° F. and pressurized to 60 psi with air. The flowrate was controlled manually with a needle valve. The pot was placed on a weigh scale, enabling consistent monitoring of the flowrate/weight loss.

The TPUB films were cast onto a matte paper casting liner at a width of 26" (66 cm) wide and thickness of 12 mil (300 micron).

Example 1

A 4 by 4 inch (10.16 cm by 10.16 cm) section of the TPUB film was laminated to a section of MRL of equal size under a vacuum of 686 mmHg for 30 minutes at 300° F. (148.9° C.) in an oven. The liner-film assembly was removed from the oven, allowed to cool to 70° F. (21.1° C.), then irradiated at 6 MRAD and 300 kV through the top surface of the urethane film using an ESI Electrocurtain® CB-300 e-beam apparatus. The resultant semi IPN microstructured riblet polyurethane film was removed from the MRL and placed in an oven set to 215° F. (101.7° C.), for 30 minutes. The film was then removed from the oven, allowed to cool to 70° F. (21.1° C.), and returned to the oven, now set to 270° F. (132.2° C.), for another 30 minutes. The film was again removed from the oven, allowed to cool to 70° F. (21.1° C.), after which it was returned to the oven, now set to 300° F. (148.9° C.), for another 30 minutes. The film was again removed from the oven and allowed to cool to 70° F. (21.1° C.).

FIGS. 1A-1D are micrographs of the semi-IPN microstructured polyurethane film of this Example 1, before heat treatment, after 215° F. (101.7° C.) treatment, after 270° F. (132.2° C.) treatment, and after 300° F. (148.9° C.) treatment, respectively. As evident in these figures, there is faithful reproduction of the microreplicated liner pattern and no noticeable degradation of the structures when subjected to the successive heat treatments.

Various modifications and alterations of this disclosure will become apparent to those skilled in the art without departing from the scope and principles of this disclosure, and it should be understood that this disclosure is not to be unduly limited to the illustrative embodiments set forth hereinabove.

We claim:

1. An article comprising
a microstructured layer having a microstructured surface bearing microstructures having an average height of greater than 3.0 microns and less than 300.0 microns, the microstructured layer comprising a semi-IPN of a polymer network selected from the group consisting of urethane acrylate polymer networks, urethane/urea acrylate polymer networks and urea acrylate polymer networks and a linear or branched polymer that is a thermoplastic polymer selected from the group consisting of thermoplastic polyurethanes, thermoplastic polyurethane/polyureas, thermoplastic polyureas, and combinations thereof; and
a removable liner having a complementary microstructured surface in direct contact with the microstructured surface of the microstructured layer,
wherein the weight ratio of linear or branched polymer to polymer network in the semi-IPN is greater than 75:25.

2. The article according to claim 1 wherein the thermoplastic polymer has a G' G" crossover point at a certain temperature and wherein the microstructures are thermally stable to the extent that they retain their shape when heated to a temperature of more than 30° C. higher than the thermoplastic polymer G' G" crossover point for 30 minutes.

3. The article according to claim 1 wherein the thermoplastic polymer has a G' G" crossover point at a temperature of less than 102° C.

4. The article according to claim 1 wherein the thermoplastic polymer is a thermoplastic polyurethane.

5. The article according to claim 1 wherein the polymer network is a urethane acrylate polymer network.

6. The article according to claim 1 wherein the microstructures having an average height of greater than 12.0 microns and an average height of less than 120.0 microns.

7. The article according to claim 1 which comprises a resin matrix-fiber composite part having the microstructured surface of the microstructured layer as an outermost surface.

8. The article according to claim 7 wherein the microstructured layer is bound to the part through an adhesive layer, wherein the microstructured layer has a back surface opposite the microstructured surface and wherein the adhesive layer is attached directly to the back surface of the microstructured layer.

9. The article according to claim 7 wherein the microstructured layer is bound directly to the resin matrix of the resin matrix-fiber composite part, wherein the microstructured layer has a back surface opposite the microstructured surface and wherein the resin matrix is attached directly to the back surface of the microstructured layer.

10. A method comprising the steps of:
a) providing a liner having a complementary microstructured surface;
b) casting onto the liner a polymer blend comprising:
  i) an oligomer selected from the group consisting of urethane acrylate oligomers, urethane/urea acrylate oligomers, urea acrylate oligomers, and combinations thereof; and
  ii) a linear or branched polymer that is a thermoplastic polymer selected from the group consisting of thermoplastic polyurethanes, thermoplastic polyurethane/polyureas, thermoplastic polyureas, and combinations thereof, wherein the weight ratio of linear or branched polymer to polymer network in the semi-IPN is greater than 75:25;
c) thereafter curing the oligomer by radiation cure to convert the polymer blend into a microstructured layer having a microstructured surface.

11. The method according to claim 10, wherein the microstructured layer has a back surface opposite the microstructured surface, additionally comprising the steps of:
d) applying an adhesive to the back surface of the microstructured layer to make an adhesive-backed microstructured layer;
e) applying the adhesive-backed microstructured layer to a part; and
f) removing the liner from the microstructured layer to make a part having the microstructured surface of the microstructured layer as an outermost surface.

12. The method according to claim 10, wherein the microstructured layer has a back surface opposite the microstructured surface, additionally comprising the steps of:
f) applying the back surface of the microstructured layer to an uncured resin matrix-fiber composite part;
g) curing the resin matrix; and
h) removing the liner from the microstructured layer to make a resin matrix-fiber composite part having the microstructured surface of the microstructured layer as an outermost surface.

13. The method according to claim 10 wherein the step of curing the oligomer by radiation cure comprises curing the oligomer by e-beam cure.

14. The method according to claim 10 wherein the polymer blend comprises not more than 1.0 weight percent solvent.

15. The method according to claim 10 wherein the step of casting onto the liner a polymer blend comprises hot melt extrusion of the polymer blend.

16. The method according to claim 10 wherein the weight ratio of linear or branched polymer to polymer network in the semi-IPN is greater than 75:25 and wherein the thermoplastic polymer has a G' G" crossover point at a temperature of less than 102° C., and wherein the thermoplastic polymer is a thermoplastic polyurethane.

17. A method comprising the steps of
n) providing an article according to claim 1, wherein the microstructured layer has a back surface opposite the microstructured surface;
o) applying an adhesive to the back surface of the microstructured layer to make an adhesive-backed microstructured layer;
p) applying the article to a part so as to join the article and part by the adhesive.

18. A method comprising the steps of
r) providing an article according to claim 1;
s) providing a part bearing adhesive on an outer surface;
t) applying the article to a part so as to join the article and part by the adhesive.

* * * * *